(12) United States Patent
Chao et al.

(10) Patent No.: US 10,713,676 B1
(45) Date of Patent: *Jul. 14, 2020

(54) METHOD AND SYSTEM FOR MANAGING DISTRIBUTOR INFORMATION

(71) Applicant: Versata Development Group, Inc., Austin, TX (US)

(72) Inventors: David Chao, Austin, TX (US); Brian Blount, Austin, TX (US); Charles Erickson, Cedar Park, TX (US); Shari Gharavy, Austin, TX (US); Cheng Zhou, Austin, TX (US); Joshua Toub, Austin, TX (US)

(73) Assignee: VERSATA DEVELOPMENT GROUP, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,869

(22) Filed: Aug. 31, 2018

Related U.S. Application Data

(63) Continuation of application No. 14/727,752, filed on Jun. 1, 2015, now Pat. No. 10,068,242, which is a
(Continued)

(51) Int. Cl.
*G06Q 20/10* (2012.01)
*G06Q 30/02* (2012.01)
(Continued)

(52) U.S. Cl.
CPC ..... *G06Q 30/0214* (2013.01); *G06Q 10/0633* (2013.01); *G06Q 10/06375* (2013.01);
(Continued)

(58) Field of Classification Search
CPC ...... G06Q 20/04; G06Q 20/10; G06Q 20/102; G06Q 40/00; G06Q 40/02
(Continued)

(56) References Cited

U.S. PATENT DOCUMENTS

| | | | | |
|---|---|---|---|---|
| 4,831,526 A | * | 5/1989 | Luchs | G06Q 40/02 705/4 |
| 5,043,891 A | * | 8/1991 | Goldstein | G06F 8/00 715/234 |

(Continued)

OTHER PUBLICATIONS

Notice of Allowance, dated May 24, 2018, U.S. Appl. No. 14/727,752, pp. 1-3.
(Continued)

*Primary Examiner* — Andrew Joseph Rudy

(57) ABSTRACT

An embodiment of the invention provides a system that enables financial services companies to manage and track information about a sales force. The system includes components for managing distributors information, for validating and tracking licenses and credentials, for creating customized contracts, and for maintaining compensation structures. The system allows for configuring compensations, providing financial services companies a toolkit for creating and modeling their complex commission schedules used to compensate their sales force. The system also provides modeling tools for agreements and contracts between a financial services company or provider and the distributors who sell products. The system has a multi-component architecture comprising multiple modules, multiple data processing engines, a backbone and multiple data sources. The processing modules carry out information processing using one or more data processing engines. The data processing provides the tools to fetch data from the databases and process it.

14 Claims, 4 Drawing Sheets

Related U.S. Application Data continuation of application No. 13/020,605, filed on Feb. 3, 2011, now Pat. No. 9,076,127, which is a continuation of application No. 09/810,514, filed on Mar. 15, 2001, now Pat. No. 7,908,304.

(51) Int. Cl.
| | | |
|---|---|---|
| *G06Q 40/08* | (2012.01) | |
| *G06Q 40/00* | (2012.01) | |
| *G06Q 30/06* | (2012.01) | |
| *G06Q 10/06* | (2012.01) | |
| *G06Q 30/00* | (2012.01) | |
| *G06Q 10/10* | (2012.01) | |

(52) U.S. Cl.
CPC .............. *G06Q 10/10* (2013.01); *G06Q 20/10* (2013.01); *G06Q 30/018* (2013.01); *G06Q 30/0601* (2013.01); *G06Q 40/00* (2013.01); *G06Q 40/08* (2013.01); *Y10S 707/945* (2013.01)

(58) Field of Classification Search
USPC .............. 705/26.1, 30, 35, 38, 39; 709/203, 709/217–223
See application file for complete search history.

(56) References Cited

U.S. PATENT DOCUMENTS

| | | | | | |
|---|---|---|---|---|---|
| 5,272,623 | A | * | 12/1993 | Grubb | G06Q 10/10 717/100 |
| 5,406,477 | A | * | 4/1995 | Harhen | G06Q 10/06 703/6 |
| 5,862,328 | A | * | 1/1999 | Colyer | G06F 9/465 709/203 |
| 5,946,660 | A | * | 8/1999 | McCarty | E05G 1/08 705/5 |
| 6,072,870 | A | * | 6/2000 | Nguyen | G06Q 20/02 705/26.1 |
| 6,170,014 | B1 | * | 1/2001 | Darago | G06F 21/10 709/229 |
| 6,629,082 | B1 | * | 9/2003 | Hambrecht | G06Q 30/08 705/35 |
| 6,901,380 | B1 | * | 5/2005 | Bremers | G06Q 30/06 705/26.81 |
| 7,472,073 | B1 | * | 12/2008 | Masi | G06Q 20/10 705/14.38 |
| 7,512,559 | B1 | * | 3/2009 | Snyder | G06Q 40/04 705/37 |
| 7,702,563 | B2 | * | 4/2010 | Balson | G06Q 10/10 705/35 |
| 7,904,326 | B2 | * | 3/2011 | Gharavy | G06Q 10/0637 705/317 |
| 7,958,024 | B2 | * | 6/2011 | Chao | G06Q 20/102 705/35 |
| 8,260,718 | B2 | * | 9/2012 | Bauchot | G06F 21/36 705/64 |
| 8,260,719 | B2 | * | 9/2012 | Carrott | G06F 21/10 705/64 |
| 9,058,610 | B2 | * | 6/2015 | Gharavy | G06Q 10/0637 |
| 9,076,127 | B2 | * | 7/2015 | Chao | G06Q 10/0633 |

OTHER PUBLICATIONS

Notice of Allowance, dated May 9, 2018, U.S. Appl. No. 14/727,752, pp. 1-15.
Response after Final Action, dated Apr. 23, 2018, U.S. Appl. No. 14/727,752, pp. 1-23.
Final Rejection, dated Nov. 22, 2017, U.S. Appl. No. 14/727,752, pp. 1-6.
Response to Non-Final Office Action, dated Oct. 26, 2017, U.S. Appl. No. 14/727,752, pp. 1-22.
Non-Final Rejection, dated May 26, 2017, U.S. Appl. No. 14/727,752, pp. 1-9.

\* cited by examiner

METHOD AND SYSTEM FOR MANAGING DISTRIBUTOR INFORMATION

FIELD OF THE INVENTION

This invention relates to the field of computer technology. More specifically, the invention relates to a method and system for managing distributor information.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

Managing sales and distribution channels has become a difficult task in today's business environment where it is necessary to quickly and fairly administer incentives for salespeople and distribution channel partners while coping with regulatory issues. To keep revenues growing and keep up with customer demands, financial services providers have to move quickly even when regulation, competition and new sales distribution channels inhibit growth. Management is expected to provide new opportunities for improved revenues and margins, while providing customers with better, faster information and services.

The distribution channel model within the financial services industry is very complex. Products are sold across multiple distribution channels and the workforce is very fluid, with individual distributors working for multiple companies and engaging in multiple agreements with service providers. There are regulatory constraints on the sales force in that all distributors who sell products must be licensed and appointed, or authorized, to sell those products. Financial services companies must track all of this information about their sales force, maintain a history of all of this information, provide incentive based compensation to their sales force, and calculate their compensation based upon numerous variables. Consequently, any plan for distribution channel management must consider the number of channels, the number of distributors, compensation complexity, regulatory and licensing requirements and the number and types of products that will be sold.

Financial service companies are being driven by increased competition to consider the use of independent agents in place of captive sales staff. Firms may wish to enhance and reward cross distribution channel interactions. They must be able to enhance distributor reporting and communication and effectively manage independent brokers and captive sales staff. They must reduce the time required to market new products and implement new compensation plans and differentiate themselves based on services offered to customers. In addition, they must be able to rapidly integrate new distribution channel acquisitions and grow distribution capabilities, while reducing administration costs.

Cost avoidance is essential as mergers and acquisitions have led to many disparate systems, some of which are antiquated. Firms must reduce implementation time for new products and compensation plans on these antiquated systems and reduce the potential for overpayment. The goal must be a reduction in the overall cost of administration. Accordingly, these companies must interact with the producers (of sales) using preferred methods and quickly model new and creative compensation plans, while consolidating compensation administration systems.

In order to provide sales representatives with an incentive to sell as much as possible, or to sell more of a desired product or products at certain prices, sales organizations create incentive plans where commissions are provided or offered to the sales representatives when specific sales goals or targets are achieved during particular period of time. In addition, an incentive plan may apportion credit to everyone on a sales representative's sales team, to the representative's manager, or someone other than the sales representative himself. Sales representatives typically receive compensation based on a salary, the hours worked, and/or on the goods or services sold. When basing compensation on transactions, specifically on the goods or services sold, sales representatives receive a commission that can be based on profits, net sales, the number of products sold, or some other variable. Other primary compensation includes gross dealer concessions. Secondary compensation includes expense allowances, persistency bonuses and overrides that can be allocated among sales teams and accumulated over time if desired.

Sales compensation for direct and indirect channels can be one of the most effective levers for aligning sales performance with business goals. Unfortunately, designing and administering effective incentive programs is a difficult management challenge. The management of a business can spend a great deal of time and money in developing incentive plans. In the prior art, the creation and distribution of incentive plans is a slow process that is prone to error. It can take months to implement a new compensation plan, and dependencies on computer software can frustrate sales managers who want to make even simple changes. Moreover, a lack of measurement tools can make it impossible to develop a "closed loop", continuous improvement process. Businesses must be able to design, process, and communicate sophisticated incentive programs that drive revenue growth across all sales channels. Businesses need to streamline the administration of quotas, territories, and commissions, and also require tools to measure and improve the effectiveness of incentive programs. This would greatly simplify the management challenge of aligning tactical business performance with strategic objectives, making it possible to react more quickly and effectively to changes in market and competitive conditions.

Quotas are a necessary component of most sales compensation plans, yet they are notoriously difficult to administer, especially when they involve multiple hierarchies. Not only is it easy to introduce problems like double counting and under- or over-payment, but also changes typically require long turnaround times while they are implemented by changes in computer software. The management of sales quotas is difficult and there is a need to be able to manage them easily and accurately, allowing business users to assign quotas by territory or position and across multiple hierarchies. Managers also require a capability to accurately track sales results and forecast future performance. Needed elements include the ability to tie quotas between positions and sales teams or positions and territories, make sales projections, a provision for quick and easy quota setting and editing, and a simple interface for use from the field.

Managing sales territories involves analyzing past results, assigning territories, and forecasting future sales performance. For most organizations, it is a difficult and time-consuming process with the result that it is commonly only undertaken once a year. Unfortunately, market conditions change continuously, making it practically impossible to keep sales territories aligned with business needs for more than a short period of time. A more automated process for territory management is needed to allow large sales organizations to keep up with the market.

Another need of firms in financial services is an ability to manage sales producer payment accounts by defining multiple accounts per representative, setting up payment rules for each account and procedures for adjustments. Loan issuance against customer accounts must also be managed. Loan and repayment schedules, and appropriate records, must be maintained. As a part of this activity, it is necessary to track eligible compensation against parameters established for the loan and to be able to track collection of the loan and initiate charge-back and from the producer if appropriate.

In the area of distributor administration, firms also would like to manage a shared repository for all producer information, including personal information, professional information and preferences. There is a need to provide a view of the roles played by individuals with an organization, and active selling agreements and reporting relationships. Firms would like a centralized distributor repository in order to be able to view, report and compensate producer relationships individually and holistically. In addition, they must reduce errors or miscalculations leading to overpayment. At the same time, these firms must assist new agent distribution channels in learning how to sell new types of products and create new distribution capabilities for existing products.

Credential management is a critical issue for many firms. They must track professional accreditation including licenses, appointments, National Association of Securities Dealers (NASD) registration and continuing education requirements for the maintenance of these professional accreditations to ensure that they are represented by appropriately credentialed representatives. This need is made more acute by constantly changing government rules and regulations, as well as by different regulations imposed by the different jurisdictions in which a firm operates. Firms must determine when renewal processing is required and manage new and renewal application processes to ensure regulatory compliance in every jurisdiction. A further problem is presented by representatives who may move from jurisdiction to jurisdiction in the course of their representation of a firm. Further, there is substantial turnover in representation resulting in a continuing need to ascertain the credentials of new representatives as well as to maintain contact with former representatives in the event that issues arise from their former representation.

In order to appropriately manage their representatives, firms must also be able to create customized contracts and selling agreements by combining reusable compensation components and personalizing agreement templates to fit individual producers. A selling contract defines a hierarchy of sales people that can sell products under that contract and it defines what products can be sold under that agreement. The selling contract also specifies commission schedules and identifies which sales people participate under a particular commission schedule. As multiple versions of such agreements may come into use over time, a procedure is needed to allow multiple users to maintain agreements through versioning, or version control, and a method must be provided to manage the approval process for agreement components and templates.

Any distribution management channel solution, in order to be useful, must have a capability for error correction, including manually inputting and adjusting all transaction information, making retroactive adjustments and viewing and managing ledger items. Other features that are desirable include the ability to cancel and rerun transactions.

Many financial services firms would like to be able to communicate distribution channel management information over the Internet so that producers can view the state of their relationship with a firm, including profile information, licenses, appointments, product information, contract and compensation information. Firms would also like to be able to perform modeling and "what if" analysis and have the ability to capture historical data to make strategic decisions about the effectiveness of future plans. A set of Web-based incentive management products that can be deployed to practically any sales or distribution channel would be useful. Such tools could greatly simplify the burden of designing, forecasting, launching, measuring, and refining incentives programs.

Computer software is necessary to implement the solution to these problems and fulfill the perceived needs just described. Such software commonly utilizes multiple related functions and data structures. To encapsulate these related functions and data structures, the software often utilizes a standard object oriented programming (OOP) language approach.

In conclusion, there is a need for a solution, implemented on a computer in an object oriented programming environment, that manages the contracts between the manufacturers of a product, which may include financial services, and the distributors of their product in an industry where there is multiple channel selling, a fluid workforce, and regulatory constraints. This solution should track information, such as contact points, payment methods, and the organizational hierarchies, on all parties in the system. It must manage regulatory information and ensure that distributors are licensed and appointed to sell the products manufactured, or distributed, by the provider. In addition, the solution must allow for compensation configuration and provide financial services companies with a toolkit for creating and modeling their complex commission schedules used to compensate their sales forces. This should include a provision for charge-back of commissions if appropriate. Also, the solution must model contracts between the financial services company, or provider, and the distributors who sell the products. The solution must calculate compensation for all distributors and should allow for access through the Internet.

SUMMARY OF THE INVENTION

The invention provides a method and system for managing contracts between manufactures of a product and the distributors of their product in an industry comprising multiple channel selling, a fluid workforce, and regulatory constraints. An embodiment of the invention provides a system that enables financial services companies to track information about their sales force, maintain a history of all of the information, provide incentive based compensation to their sales force, and calculate their compensation based upon numerous variables. The system referred to hereinafter as Distributor Management System Suite (DMSS) comprises a suite of applications that provide tracking information, such as contact points, payment methods, and organizational hierarchies on all parties in the system, managing regulatory information and ensuring that distributors are licensed and appointed to sell the products manufactured by the provider. The DMSS provides financial services institutions with the means to maintain distributor records, contracts, and commissions. The DMSS includes components for managing information related to distributors, validating and tracking licenses, creating customized contracts, and maintaining compensation structures. The information stored in the DMSS database includes contract components and rules, distributor financial information, bonus schedules, and license and appointment data.

In an embodiment of the invention, the DMSS allows for configuring compensations, providing financial services companies a toolkit for creating and modeling their complex commission schedules used to compensate their sales force. The DMSS provides modeling capabilities for agreements and contracts between a financial services company or provider and the distributors who sell products. In an embodiment of the invention, the DMSS calculates compensations for all distributors, processes payment and manages dept.

In an embodiment of the invention, the DMSS comprises several components comprising management modules, a backbone, one or more data processing engines, databases, and storage management components. The backbone allows for data exchange between components of the DMSS comprising module-to-engine and engine-to-database data exchange.

In an embodiment of the invention, the DMSS comprises data processing engines. These system components are designed to draw information from the DMSS databases, process the information, and store the result in a database for further use by the DMSS modules and engines.

In an embodiment of the invention, the DMSS is composed of several modules comprising a distributor administration module, a license and appointment module, a selling agreements module, a debt management module, and a payment module. These modules interact with the backbone and engines to maintain relationships between financial services institutions and their distributors.

DETAILED DESCRIPTION

Figure 1:
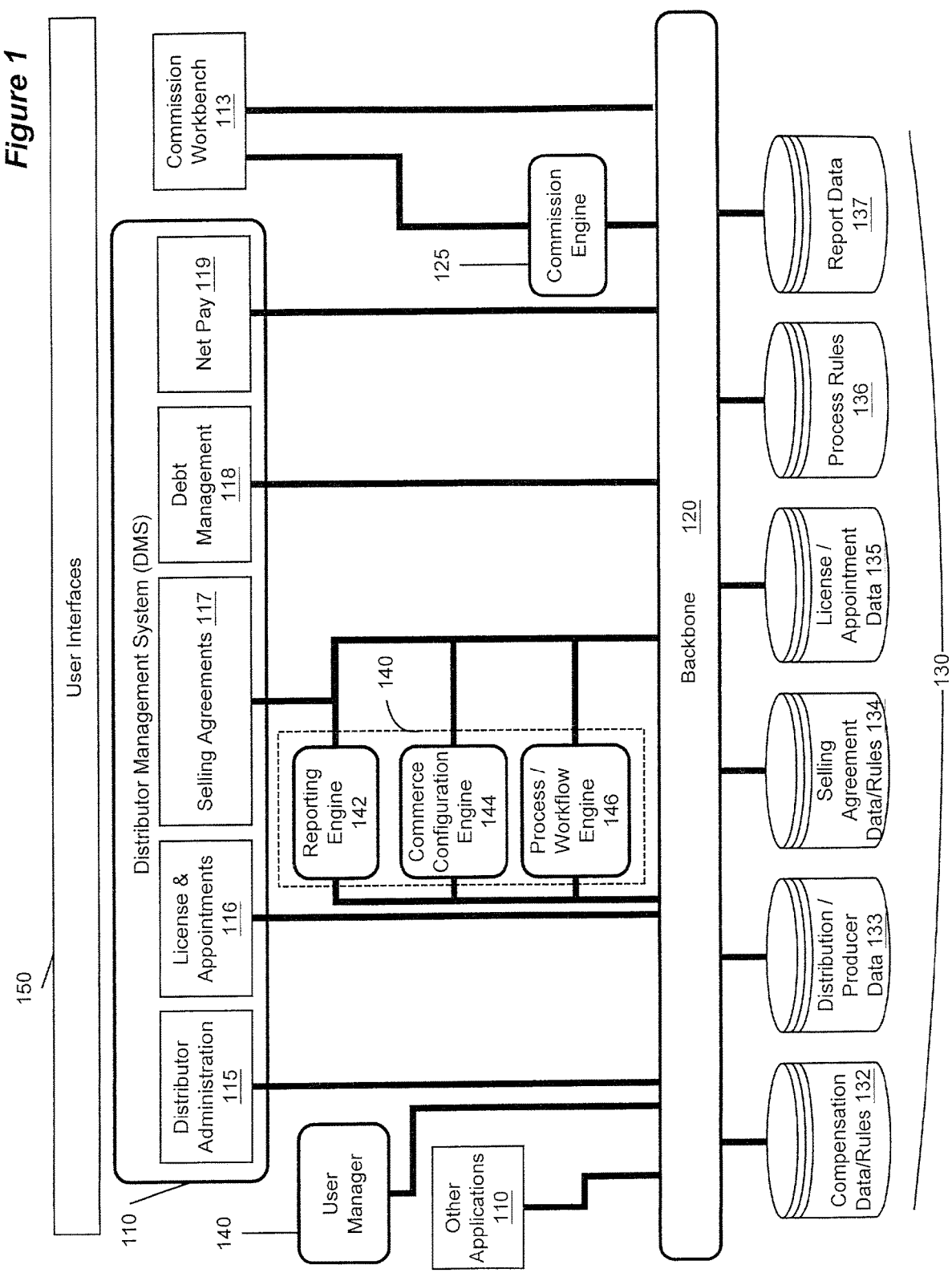
FIG. 1 shows a block diagram representing an embodiment of a system that utilizes the Distributor Management System Suite (DMSS).

The invention provides a method and system for managing distributor information. In the following description, numerous specific details are set forth in order to provide a more thorough understanding of the invention. It will be apparent, however, to one skilled in the art, that the invention may be practiced without these specific details. In other instances, well-known features have not been described in detail in order to avoid unnecessarily obscuring the invention.

System Overview:

An embodiment of the invention comprises an extensible method for managing relationships between institutions (e.g., suppliers/manufacturers) of a product or service and the distributors of their product. Aspects of the invention are targeted at industries where there is multiple channel selling, a fluid workforce, and regulatory constraints upon products sales. For example, systems embodying the invention provide a way to manage the agreements that financial services companies have with the distributors who sell their products. Thus, organizations such as life insurances companies may utilize embodiments of the invention to manage the sale and distribution of life insurance plans in a way that coincides with the regulatory constraints of government organizations.

Such companies can utilize embodiments of the invention to track information about the company's sales force, maintain a transaction history of the information associated with multiple products, provide incentive based compensation to the company's sales force, and calculate sales force compensation based upon numerous variables. For example, the system referred to hereinafter as Distributor Management System Suite (DMSS) comprises a suite of applications that provide tracking information, such as contact points, payment methods, and organizational hierarchies on all parties in the system, managing regulatory information and ensuring that distributors are licensed and appointed to sell the products manufactured by the provider.

In one embodiment of the invention, DMSS comprises a suite of multiple engines and modules each configured to provide functionality that helps manage the flow of information between distributors and suppliers. Generally, DMSS provides users with a mechanism for managing information related to distributors, validating and tracking licenses, creating customized contracts, and maintaining compensation structures. To perform such functions the system configured in accordance with one embodiment of the invention stores information such as contract components and rules, distributor financial information, bonus schedules, and license and appointment data. The engines and modules of DMSS may, for example, be configured to perform at least the following functions:

1) Provide financial services institutions with the means to maintain organization hierarchies associated with parties on the system (e.g., distributor records), track information such as contracts, and payment methods (e.g. how a distributor is paid).

2) Manage regulatory information and ensures that distributors are licensed and appointed to sell the products manufactured by the provider.

3) Perform compensation configuration. It provides financial services companies a toolkit for creating and modeling their complex commission schedules used to compensate their sales force. For example, the system may calculate compensation for all distributors by building on top of a commission engine and using the engine, the commission models, and the agreement models to calculate the compensation for all of its sales force.

4) Models agreements or contracts between the financial services company or provider and the distributors who sell the products. These agreements are termed 'Selling Agreements'. A selling agreement defines a hierarchy of sales people that can sell products under that contract, it defines what products can be sold in that agreement, it defines what commission schedules can be used in that agreement, and it defines which sales people participate in which commission schedule. The DMSS may utilize the terms defined in selling agreements to calculate compensations for all distributors.

5) Managing information related to distributors, validating and tracking licenses, creating customized contracts, and maintaining compensation structures. The information stored in the DMSS database comprises information such as contract components and rules, distributor financial information, bonus schedules, and license and appointment data.

6) Manages payment and debt to distributors/sales representatives (e.g., net-pay and debt management).

In accordance with one embodiment of the invention DMSS is built on top of a commission engine configured to model and calculate commission for the sales force. A commission engine takes two inputs, a commission model and a set of transactions, and generates ledger items (that correspond to payments) as output. Each transaction represents a physical sales transaction, such as distributor selling a life insurance policy. The commission model represents two critical pieces of data: the sales team hierarchy and the commission schedules. The sales team hierarchy comprises a hierarchy of all sales people that will be responsible for a transaction. The commission schedules define formula for translating transactions into ledger items. Commission schedules may be modeled through quota, bonus, and plan objects. The commission model utilized in one or more embodiments of the invention is described in further detail in pending patent application Ser. No. 09/081,857, entitled "Method and Apparatus For Determining Commission", which in incorporated herein by reference.

DMSS complements the commission engine in that it provides a mechanism for modeling selling agreements with commission models. In accordance with one embodiment of the invention, at least one commission model exists for each selling agreement in DMSS. Agreement hierarchies are modeled within the sales team hierarchy. The agreement commission schedules are stored in accordance with one embodiment of the invention in the commission model's quota, bonus, and plan objects.

The commission schedules used in an agreement are often the same or similar across agreements. Therefore, the agreements are put together from contract kits. A contract kit contains a set of commission schedules (also referred to as compensation components) that can be used within an agreement. Each compensation component and contract kit is versioned, and the compensation component contains the commission schedule information needed to generate a complete commission schedule in the commission model. Each agreement is then created from one contract kit, and when the agreement is created a user can selected which components from the kit to include in the agreement. When a new version of a component or kit is created, a user can select to cascade the new version to all the agreements that use it, or to leave the agreement using the old version.

DMS provides additional functionality by allowing dependencies between models through linked hierarchies and pooling agreements. It is often common for one party to receive credit or rollup from somebody's work in a different agreement. This is accomplished through linked hierarchies. A distributor (Ted) in one agreement (AG1) make be linked to another distributor (Fred) in another agreement (AG2). This allows transactions for Fred and all of his descendants to also be credited to Ted.

It is also common for multiple parties to want to share work across agreements. For example, one may wish to use one quota to calculate qualification on a quota level, and another quota to calculate payout. In this example, one would want several parties performance to contribute to the qualification quota, even parties in different agreements. Pooling agreements provide this functionality, by pooling work from different agreement participants from potentially different agreements into one quota. An extensible object model in accordance with one embodiment of the invention provides a framework for representing such agreements.

System Components:

FIG. 1 shows a block diagram representing an embodiment of a system that utilizes the Distributor Management System Suite (DMSS) 105. As shown in FIG. 1, the DMSS comprises management modules 110, a backbone 120 allowing data exchange between applications and databases, and between applications, a commission engine 125, a number of additional data processing engines 140, and data storage and storage management components 130. The DMSS is also configured to allow for the addition of more applications and plugins 110 to provide additional services.

In an embodiment of the invention, the DMS comprises several modules and applications. In this example, the system is used by financial organizations to manage sales agreements, distributor credentials, and sales compensation. However, the reader should note that the system embodying the invention is also applicable outside of the financial services industry and that the term financial organization is utilized for illustrative purpose only. The invention is not limited solely to the financial services industry, but may be applied to other industries. For example, the system may be utilized in any business environment having a need to determine if individuals associated with a sale are appropriately licensed, compensated. The invention may also be applied to other business situations were companies must operate pursuant to the terms of an agreement.

DMSS comprises a DMS Database which may exchange data with modules and engines via backbone 120. In accordance with one embodiment of the invention, backbone 120 comprises an information infrastructure used to integrate applications 110, engines 140 and 125, and databases 130. Backbone 120 facilitates communication between data resources and modules, and integration of different computing equipment, including local networks, web interfaces, and back-office systems. Thus, backbone 120 provides a mechanism for maintaining data storage and retrieval, in addition to communicating changes and updates to the other modules. Backbone 120 is configured to retrieve data from the database in response to the needs of DMSS modules and engines and transmit that data to its requestor. Backbone 120 provides an extensible framework suitable for building and integrating applications customized for the needs of individual clients. Backbone 120 receives information from the DMSS modules and acts on it, storing the resulting object or sending it back to the module. As modules perform their tasks and functions, the backbone communicates changes and updates to the rest of the applications. Backbone 120 also provides communication between the modules by sharing data and functions. The DMSS and other applications 110, engines 140, and databases 130 may execute bi-directional requests and responses across backbone 120. Backbone 120 is configured to retrieve data from the database in response to the needs of DMSS modules and engines and transmit that data to its requestor. Backbone 120 eliminates some of the need for developing custom code, and allows developers to integrate new applications without knowing all the other applications in the system.

Engines 140 and 125 may be launched by the DMSS modules via the backbone and draw information from the DMSS databases. The engines process the information, and store the resulting object in a database or the backbone for further use by the DMSS modules and engines. A commission engine 125, configured in accordance with one embodiment of the invention, utilizes backbone 120 to gather information about agreements from the database. Commission engine 125 may, for example, identify relevant data in the database and produce a set of objects. Once the engine has processed all the objects, commission engine 125 can generate payments based on the agreements.

Workflow process engine 146, operating in accordance with one embodiment of the invention, starts and responds to workflow events received from the DMSS modules through backbone 120. Workflow process engine 146 completes the desired workflow event and sends that information back through backbone 120. In an embodiment of the invention workflow engine 146 enables users to create and run one or more business processes. The processes may be created in a formatted data input (e.g. XML or Java) and become objects (business rules) in the backbone. The workflow engine 146 enables the flow of information in the DMSS and provides users with a customizable mechanism for creating business processes.

The DMSS may comprise a commerce configuration engine 144 that allows users to define and enforce the set of rules governing how contract kit components (e.g., document components and compensation components) are combined into agreements for each distributor. The internal processes utilized by configuration engine 144 are described in further detail in U.S. Pat. No. 5,825,651, entitled "Method and Apparatus For Maintaining and Configuring System", which in incorporated herein by reference. The commerce configuration engine 144 utilizes the contract kit for creating agreements between a distributor and a financial services company.

A reporting engine 142 may be added to the DMSS and configured to generate reports and store such reports in the database. Each component of an agreement has a corresponding document, generated from report templates, which describes that component. The DMSS may also have additional modules comprising a distributor administration module 115, a license and appointment module 116, a selling agreements module 117, a debt management module 118, and a payment module to which is may be referred to also as Net Pay module 119. These modules interact with backbone 120 and engines to maintain relationships between financial services institutions and their distributors.

In one embodiment of the invention, distributor administration module 115 enables a financial services institution to record and track a broad set of information associated with the institution's distributors. The distributor information may be stored in a central database and used by all other modules of the DMS suite. Distributor information may comprise personal contact information (e.g. address, telephone, facsimile, email etc.), including information about multiple contact points, information from background checks (e.g. education, previous relationships with financial services institutions, personal credentials etc.), financial information (e.g. bank address/account information and payment, advance, repayment history etc.), license and appointment information (e.g. state and product eligibility), including current and historical license and appointment data, information about errors and omissions coverage.

Distributor information may also comprise any other type of information associated with the distributor and/or the sales of product on behalf of the institution. Distributor administration module 115 may also provide services for creating and managing distributor database information, setting up organizational entities, such as sales teams, placing individual distributors in the teams, modifying the distributor information, and creating and managing a repository for data about selling agreements established between the financial services institutions and distributors. Also, distributor administration module 115 may provide services for defining and managing relationships between different organizations (e.g. such as the financial services institution and a distributor or between regional directors and sales offices), identifying and managing calendar-based events associated with distributors such as selling agreement, licensing, and appointment renewals, background check renewals, and errors and omissions coverage renewals.

A licensing and appointments module 116 may also be integrated into the DMSS and configured to enable financial services institutions to manage the license and appointment credentials for distributors and to validate compliance with industry regulations. The licensing and appointment rules enforced by the DMS suite are applied to distributors managed by the system, whether they are employees of the financial services institution or employed by an external distributor. However, the licensing and appointment rules may be selectively enforced in the event that a user defines a set of rules defined a decision tree for performing selective enforcement.

Licensing and appointments module 116 may also provide several services comprising defining license/appointment types by company, state, and either product or product line, determining the license and appointment requirements for producers (e.g., distributors or sales representatives) based on their state of operation, the products the producer sells, the kind of compensation paid to such producers and their role, monitoring license and appointment information associated with individual producers on a calendar and schedule basis and determine when renewal application processing is required, managing the license application process for renewals, updating licenses (e.g. for new products or states). In one embodiment of the invention, licensing and appointments module 116 includes the documentation and workflow for the application approval process providing services comprising managing the appointment application process for both renewals and new appointment requests, including the documentation and workflow for the application approval process, providing license and appointment checking as required (e.g. for sales compensation or processing new business), validating that licensing/appointment requirements are met and holding activity until requirements are met.

When selling agreements module 117 is integrated into the DMSS in accordance with one embodiment of the invention, the selling agreements module 117 enables a financial services institution to define and create individual business contracts with distributors. A selling agreement defines the scope and terms of the relationship between the parties involved, commission and bonus schedules, and documents describing the relationship. In one embodiment of the invention, each selling agreement defines a hierarchy of sales people that can sell products under that contract, it defines what products can be sold in that agreement, it defines what commission schedules can be used in that agreement, and it defines which sales people participate in which commission schedule. Selling agreements are built from pre-defined contract kit components customized during negotiations. For example, a selling agreement may be formulated using contract kits comprised of components such as compensation components and document components. Each selling agreement is assembled by the system using rules (e.g., a component may be required, optional, or standard) defining the relationships between each of the components. Compensation components define the commission structure associated with a product to be sold and document components provide other information related to the agreement (e.g., contract terms etc. . . . ).

The distributor's performance is measured and commission is paid according to the terms of the agreement (e.g., defined in compensation components). In an embodiment of the invention, customizable contract kit components enable a financial services institution to define the content of contracts and the processes by which they are administered. The kits detail the rules and documentation required for the administration of the agreement. A financial services institution defines the events that may occur and provides a set of possible responses to each event using various contract kit components. Selling agreements module 117 may use contract kits to perform several tasks comprising: defining agreements that consist of contract components, defining the set of rules governing how contract kit components are combined into selling agreements for each distributor, managing the approval process for contract kit components and contract kits prior to their promotion to active use, activating contract kit components and contract kits for use, retiring contract kit components from active use, integrating with the commission engine to enable compensation calculations based upon the parameters set in the selling agreement.

In an embodiment of the invention, DMSS comprises an integrated debt management module 118 which enables a financial services institution to manage distributor advances and repayments. The debt management module enables a user to define and manage the business rules and parameters for the approval and payment of advances (e.g., via an interface). A user may make adjustments to advance balances based on actual value received from commission and accelerate repayment schedules if commissions are insufficient. The debt management module enables a user to define the rules and parameters associated with advances. The debt management module enables a user to define the following: classes of distributors who qualify for advances, qualification criteria for advances (e.g. the distributor's length of service, sales history, and past earnings), ratio of advances to projected income, taking into account any outstanding advances, repayment schedule and interest rate to be paid, source of repayment income or the policy the advance is to be recouped from, whether the amount is a percentage or flat rate, accelerated repayment schedules. For example, if a distributor's income projections fall below repayments, a user may modify the repayment terms, a user may also perform other activities such as initiating advances and repayment schedules, and tracking performance of debts.

The DMSS may also comprise a payment module 119 that enables financial institutions to track and calculate payments to distributors. Payment module 119 (also referred to as a net pay module) determines a distributor's net pay by adjusting the party's total earned compensation (calculated by commission engine 125) according to a set of payment adjustment rules. The commission engine utilized in one embodiment of the invention is described in further detail in pending patent application Ser. No. 09/081,857, entitled "Method and Apparatus For Determining Commission", which in incorporated herein by reference. These rules can be used to capture repayment schedules for outstanding debt, and transfer payments to an alternate payee. In accordance with one embodiment of the invention, payment module 119 also allows splitting up net payments into individual disbursements, directing different parts of compensation to different accounts.

In one embodiment of the invention DMSS may also comprise a user manager application 140 which defines and restricts user access and usage of the DMS suite. The system may use role-based access control, where roles are given specific permissions to data and entities. Users of the DMS suite have several levels of usage and control in the application based on the pre-defined roles. A user may customize these roles through the application user manager 140. In an embodiment of the invention, a workbench application 113 is provided to enable users to view and manage sales transactions and distributor performance data, and to run the DMS engine.

The DMSS comprises, in addition to modules and engines, a set of user interfaces 150. User interfaces comprise a browser-based system for managing the DMSS applications. This browser-based system may be implemented using any network enabling communication protocols and applications. For example, the browser-based user interface may include Java Server Pages, script based common gateway interface or any application capable of accessing the databases and producing intangible data that can be rendered by a client browser.

Information Types:

In an embodiment of the invention, the DMSS comprises several types data stored in the databases and corresponding modules, and used in module-to-module, module-to-engine, and engine-to-engine communication. The system may represent such data in data objects. Compensation data and compensation rules data objects 132 store information for the agreements module of the DMSS. This data may include contract components such as quota levels, bonus rules, and commission-based rules for eligibility. Distributor data and producer data objects 133 store information about a financial services institution's distributors for the distributor administration 115 and the other modules of the DMSS. This data includes contact information, background checks, continuing education credits, and financial information.

Selling agreements data and selling agreement rules data objects 134 provides sharing data with the Agreements module 117 of the DMSS. Information in this database includes rules for contracts between financial services institutions and distributors, data defining the terms of contracts, and commission and bonus schedules. License data and appointment data objects 135 are used by the license and appointments module 116 of the DMSS. This data includes license and appointment credentials and variations of license and appointment types (such as variations by state or product). The data is also used to validate that requirements for a license are met. Process rules data objects 136 contain information relating to the DMSS workflow service. This data includes agreement components and business rules and data. Report data objects 137 contain report data and agreement components and may share information with the report engine.

System Components Interactions

In an embodiment of the invention, modules perform their tasks and functions using the backbone 120. The backbone 120 communicates changes and updates to the rest of the applications. The Backbone also provides communication between the modules by sharing data and functions. The backbone 120 maintains data storage and retrieval, in addition to communicating changes and updates to the other modules. The backbone retrieves data from the database in response to requests from DMSS modules and engines and transmits that data to its requestor.

Figure 2:
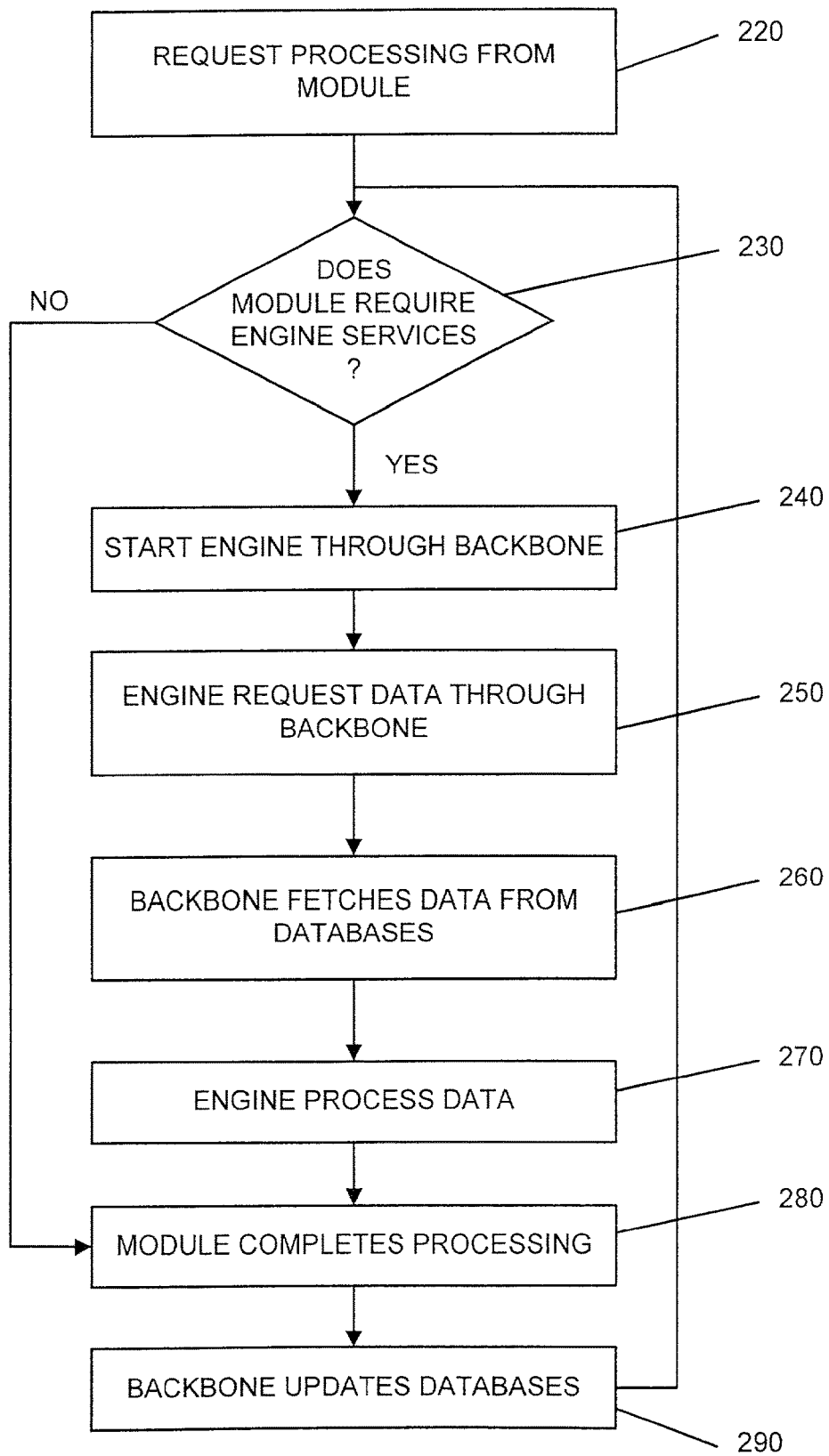
FIG. 2 comprises a flowchart showing the process of communicating between modules, the data processing engine, the DMSS backbone and the databases in an embodiment of the invention.

FIG. 2 is flowchart showing the process of communicating between modules, the data processing engine, the DMSS backbone and the databases in an embodiment of the invention. In step 220 a request is received by the DMSS to perform a data processing task. This step involves starting the modules required to handle the data processing task. The module data processing task may require one or more services provided by specific data processing engines. The module determines, if a specific engine's services are needed in step 230 and may start the designated engine by issuing a request through the backbone in step 240. In one embodiment of the invention, the module calls directly to the engine and the engine loads data through the backbone. In either case, the engine may request the data necessary for processing the modules request in step 250 though the backbone. The backbone fetches the data from different sources of databases in step 260. The engine processes the modules request in step 270 and returns the processing result through the backbone to the module. The module completes the processing in step 280 and continues processing the data. The backbone updates the databases and other modules in the DMSS in step 290.

Figure 3:
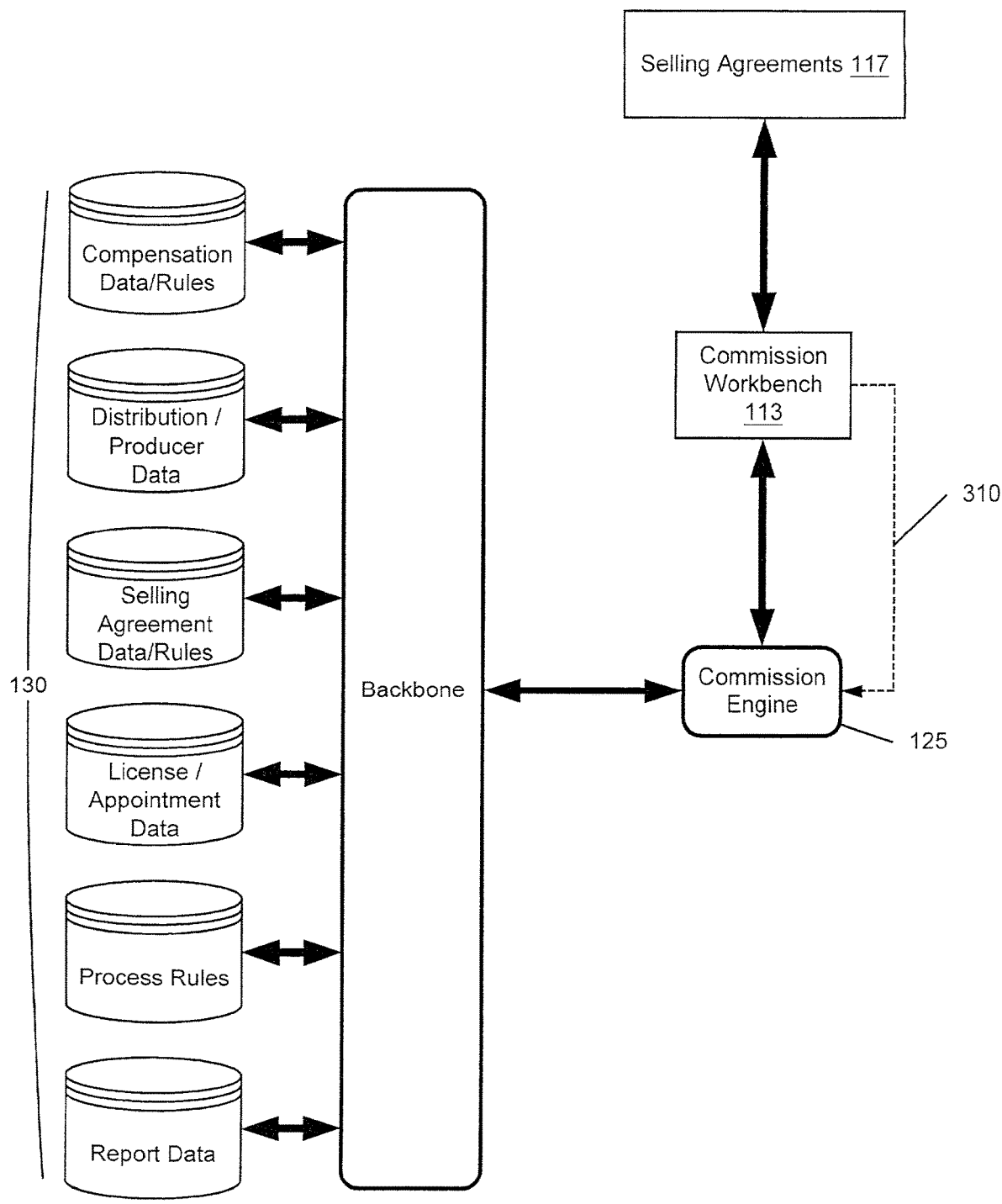
FIG. 3 show a block diagram representing an example of interactions occurring within DMSS modules and engines in an embodiment of the invention.

FIG. 3 show a block diagram representing an example of interactions occurring within DMSS modules and engines in an embodiment of the invention. In this example, the selling agreements module 117 of the DMSS, acts through the workbench 113. The workbench 113 starts commission engine 125 by sending a request 310. In response, the engine obtains the appropriate agreements information from the databases via the backbone 120 for its calculations and compensation functions. The commission engine gathers information about agreements from the database through the backbone. The commission engine identifies relevant data in the database and produces a set of objects for the selling agreements module. Once the engine has processed all the objects, it can generate payments based on the agreements. The resulting information is stored in the database for extraction by the DMSS applications.

FIG. 5 provides an illustration of the process flow utilized in accordance with one or more embodiments of the invention. The figures shows that the system described above may be utilized to generate the selling agreement that defines a relationship between multiple parties (e.g., step 500). Once the selling agreement is generated the system may determine a commission amount associated with a sales transaction performed by one of the parties based on said selling agreement (e.g., step 502). However, before the system pays out the commission amount it may determine if the parties associated with the sales transaction conform to regulatory or business requirements (e.g., step 504). For example, the system may determine whether the parties are validly licensed or authorized to perform such sales transactions. If the second party is not validly licensed, the system may reject the sales transaction (e.g., step, 506). Once that determination is performed the system may distribute an appropriate payment (e.g., commission amount) to individuals associated with said sales transaction (e.g., step 508). In one embodiment of the invention, the distributed amount takes into account any deductions or credits (e.g., via the payment engine or debt engine) that are to be applied to the commission amount. For example, the person responsible for the transaction (e.g., sales representative) may be paid some amount minus an amount owed.

Computer Execution Environment (Hardware)

Figure 4:
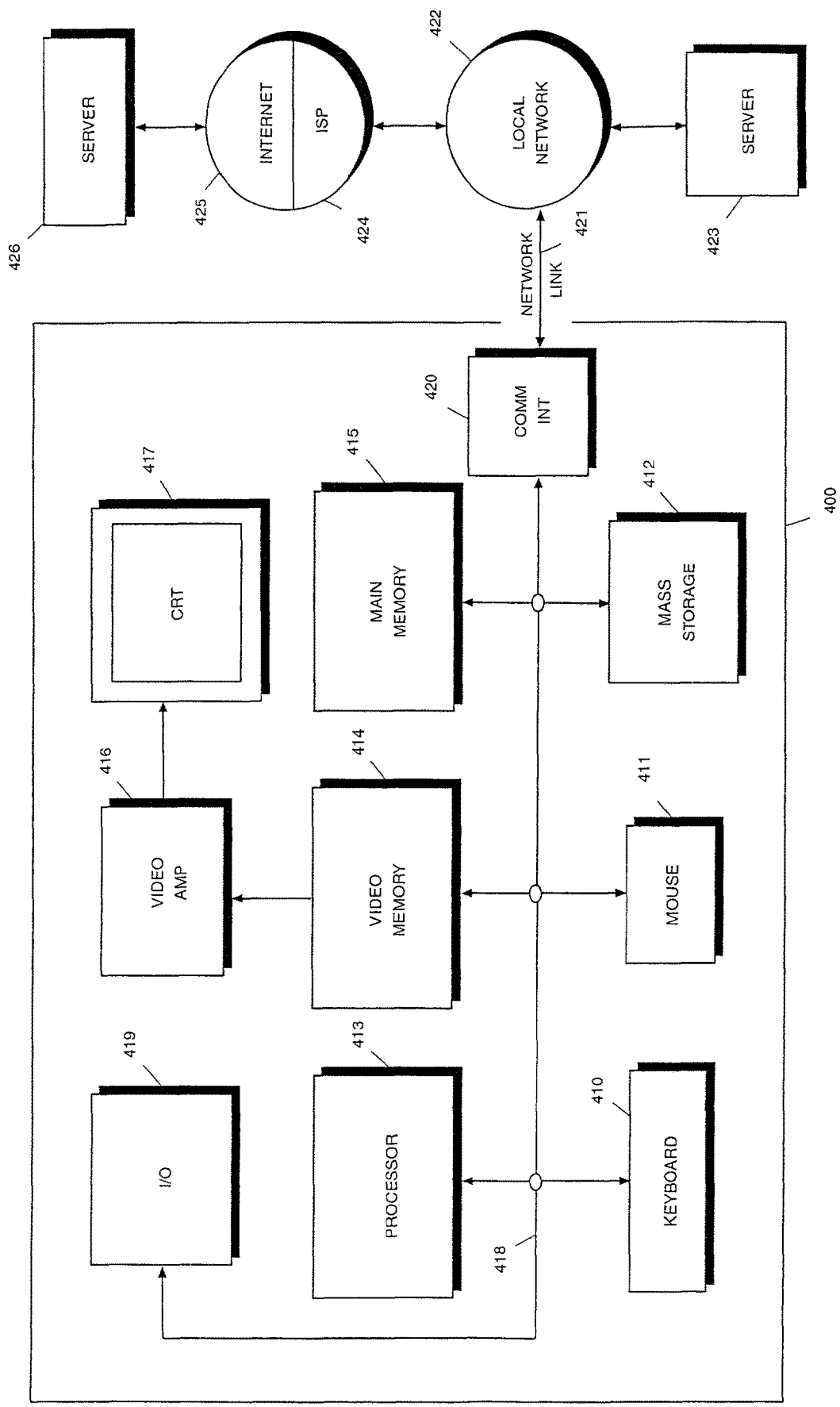
FIG. 4 shows a hardware environment for executing one or more aspects of the invention.

An embodiment of the invention can be implemented as computer software in the form of computer readable code executed on a general purpose computer such as computer 400 illustrated in FIG. 4, or in the form of byte code class files executable within a Java™ runtime environment running on such a computer, or in the form of byte codes running on a processor (or devices enabled to process byte codes) existing in a distributed environment (e.g., one or more processors on a network). A keyboard 410 and mouse 411 are coupled to a system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to system bus 418 represents such I/O elements as a printer, A/V (audio/video) I/O, etc.

Computer 400 includes a video memory 414, main memory 415 and mass storage 412, all coupled to system bus 418 along with keyboard 410, mouse 411 and processor 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 64-bit data bus for transferring data between and among the components, such as processor 413, main memory 415, video memory 414 and mass storage 412. Alternatively, multiplex data/address lines may be used instead of separate data and address lines.

In one embodiment of the invention, the processor 413 is any suitable microprocessor or microcomputer for processing data. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Wireless links are also possible. In any such implementation, communication interface 420 sends and receives electrical, electromagnetic or optical signals that carry digital data streams representing various types of information.

Network link 421 typically provides data communication through one or more networks to other data devices. For example, network link 421 may provide a connection through local network 422 to local server computer 423 or to data equipment operated by an Internet Service Provider (ISP) 424. ISP 424 in turn provides data communication services through the worldwide packet data communication network now commonly referred to as the "Internet" 425. Local network 422 and Internet 425 both use electrical, electromagnetic or optical signals that carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, remote server computer 426 might transmit a requested code for an application program through Internet 425, ISP 424, local network 422 and communication interface 420.

Processor 413 may execute the received code as it is received, and/or stored in mass storage 412, or other non-volatile storage for later execution. In this manner, computer 400 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems programs, apparatus, and/or methods described above are for purposes of example only. An embodiment of the invention may be implemented in any type of computer system or programming or processing environment. Thus, a method and system for managing distributor information is described in conjunction with one or more specific embodiments. The invention is defined by the claims and their full scope of equivalents.

What is claimed is:

1. A method comprising:
    executing code in a computer system to start each one or more services to perform at least:
    generating a request, by the executing code, to retrieve data from one or more data sources to determine commission amounts payable to a party associated with a sales transaction;
    in response to the request, retrieving data, including selling agreement data, from the one or more data sources that is used to determine a commission amount payable to a party associated with a sales transaction based on the selling agreement;
    generating a request to retrieve authorization related data from one or more data sources that is used to determine whether the party associated with the sales transaction meets requirements to receive the commission amount based on proceeds associated with the sales transaction;
    processing the authorization related data, the sales transaction data, and data associated with the party associated with the sales transaction to determine if the party associated with the sales transaction is authorized to receive a commission based on proceeds associated with the sales transaction;
    determining, by the executing code using the data retrieved, including the selling agreement data, a commission amount payable to the party associated with the sales transaction based on at least the selling agreement data; and
    if the executing code determines that the party associated with the sales transaction is authorized to receive the commission amount based on proceeds associated with the sales transaction, generating a payment report associated with said sales transaction to the party in accordance with the determination of the commission amounts payable to the party associated with the sales transaction.

2. The method of claim 1 further comprising:
    determining if a party associated with the sales transaction comprises a valid appointment.

3. The method of claim 1 wherein the party is a distributor of the one or more products and the distributor and a supplier of the one or more products are parties to the selling agreement.

4. The method of claim 1 further comprising:
    providing data to monitor to allow the monitor to display a user interface;
    receiving data representing interactions with the user interface, wherein the data indicates selections of selling agreement attributes and rules;
    generating a selling agreement using the selected attributes and rules, wherein the selling agreement.

5. A method for managing relationships between parties to a selling agreement, the method comprising:
    executing code in a computer system to perform at least:
        obtaining at least one of a plurality of data objects from a database, wherein the database comprises data representative of (i) at least one party associated with the selling agreement, (ii) the selling agreement, and (iii) authorization for the distributing party to receive compensation for selling a product in accordance with the selling agreement;
        accessing the data representative of the selling agreement and a rules database, an authorization database, and a compensation data/rules information including license and appointments information; and
        determining whether the party associated with the selling agreement conforms with the selling agreement and the license or appointments information indicates a valid authorization to allow the party associated with the selling agreement to receive a commission for a sale of one or more products in accordance with the selling agreement.

6. The method of claim 5 further comprising:
    an interface for obtaining a plurality of business rules defining relationships between an institution and the party associated with the selling agreement.

7. The method of claim 5 wherein the code comprises a commission engine that when executed generates commission schemes utilized to model a set of selling agreement objects.

8. The method of claim 7 wherein a distributor management engine generates payments based on selling agreement objects.

9. The method of claim 5 further comprising:
    generating a plurality of reports associated with the commission associated with the party associated with the selling agreement.

10. The method of claim 5 further comprising:
    validating license or appointment compliance with a set of industry regulations by evaluating the license and appointments information.

11. The method of claim 5 further comprising:
    enabling an institution to track and calculate payments to the party associated with the selling agreement.

12. The method of claim 11 wherein the institution comprises a financial services institution.

13. The method of claim 5 wherein the first party comprises a financial services institution.

14. The method of claim 5 further comprising:
    determining payment to the at least one distributing party in association with a sales of the one or more products in accordance with (i) a determination of commission amounts in accordance with the at least one selling agreement and (ii) a determination of whether the at least one distributing party has a valid license to sell the one or more products associated with the sales transaction.

\* \* \* \* \*